United States Patent [19]

Ennis et al.

[11] Patent Number: 4,652,368
[45] Date of Patent: Mar. 24, 1987

[54] WATER FILTRATION SYSTEM

[75] Inventors: G. Thomas Ennis, Playa Del Rey, Calif.; Robert G. Chelton, Boca Raton, Fla.

[73] Assignee: N/S Corporation, Inglewood, Calif.

[21] Appl. No.: 871,085

[22] Filed: Jun. 5, 1986

Related U.S. Application Data

[63] Continuation of Ser. No. 646,029, Aug. 29, 1984, abandoned, which is a continuation of Ser. No. 427,008, Sep. 29, 1982, abandoned.

[51] Int. Cl.$^4$ .............................................. B01D 21/02
[52] U.S. Cl. ........................................ 210/97; 210/121; 210/167; 210/195.3; 210/197; 210/258; 210/262; 134/109; 134/111; 134/123
[58] Field of Search ................. 210/97, 121, 130, 167, 210/194, 195.1, 195.3, 197, 258, 262, 499, 513; 134/109, 111, 123

[56] References Cited

U.S. PATENT DOCUMENTS

| | | | |
|---|---|---|---|
| 3,398,673 | 8/1968 | Koplock | 210/167 |
| 3,450,266 | 6/1969 | Allen | 210/167 |
| 3,502,215 | 3/1970 | Cahan | 210/167 |
| 3,550,778 | 12/1970 | Kesselman | 210/167 |
| 3,616,917 | 11/1971 | Hellwedge | 210/167 |
| 3,774,625 | 11/1973 | Wiltrout | 210/167 |
| 3,810,544 | 5/1974 | Armstron | 210/167 |
| 3,836,001 | 9/1974 | Heldreth | 210/167 |
| 3,923,658 | 12/1975 | Lancaster | 210/167 |
| 4,168,231 | 9/1979 | Allen | 210/167 |
| 4,362,628 | 12/1982 | Kennedy | 210/167 |

*Primary Examiner*—Ernest G. Therkorn
*Attorney, Agent, or Firm*—Cahill, Sutton & Thomas

[57] ABSTRACT

A constant-recirculation filter system for decontaminating and reusing wash water in vehicle washing installations and other applications in which water recycling is needed. The elements of the system are selected to avoid need for backwashing operations, thereby enabling use by unskilled personnel. Unrecycled fresh water is used to rinse vehicles, and to provide makeup water to the recirculating system.

11 Claims, 2 Drawing Figures

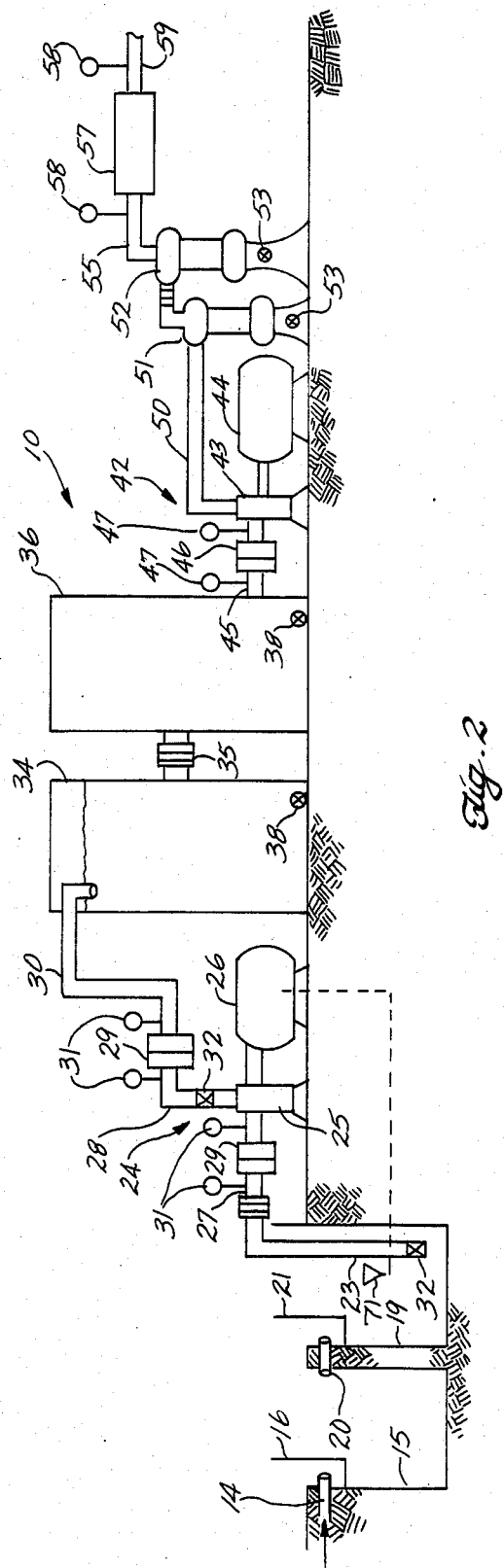

WATER FILTRATION SYSTEM

This is a continuation of application Ser. No. 646,029 filed, Aug. 29, 1984, which in turn is a continuation of Ser. No. 427,008, filed Sept. 29, 1982, both now abandoned.

BACKGROUND OF THE INVENTION

Automatic vehicle-washing systems are well-known, and are in widespread use for washing passenger automobiles, trucks, buses, railroad equipment, and the like. A typical system includes a conveyor for moving the vehicle through the installation, and a series of power-driven brushes which are moved around the vehicle under a drenching spray of water and soap or detergent to remove dirt and grease. The washed vehicle is given a drenching spray of clean rinse water, and is then moved to a drying station, with final drying of windows and bright metal parts usually being completed by hand.

Operating economy and the need for water conservation dictate recovery and reuse of the contaminated water collected in a floor trench beneath the vehicle path. Fresh makeup water must also be introduced to supplement lost water (typically five to ten gallons) carried out of the system by each vehicle. Recovered water is usually quite dirty, and particulates and oily residues must be removed from the contaminated water before recycling through the system.

A typical filter system for vehicle wash water is shown in U.S. Pat. No. 4,104,164, and this system is useful in many such installations. This arrangement, and other commercially available filter systems, are not ideal, however, in that they use filter elements which must be backwashed rather frequently. Backwashing is a technical step requiring a reasonably skilled operator to manipulate valves and other controls to achieve the necessary backflow and routing of contaminate flow to a sewage line. There is need for a simple filter system which can be operated and maintained by unskilled personnel, and it is to this need that our invention is partially directed.

Another problem with known systems is with prevention of bacteria and algae growth in water storage tanks. Absent frequent tank cleaning, and addition of sterilizing chemicals to the tanks, the water soon becomes contaminated and acquires a strong and unpleasant odor. An important feature of our new system is the use of constant recirculation which suppresses growth of bacteria and algae, and accompanying odor.

The new system is ideally suited for recycling of water in vehicle washing installations, but is not limited to this application, and is believed useful in other kinds of installations benefitting from recovery and filtered recycling of contaminated water.

SUMMARY OF THE INVENTION

This invention is directed to a constant-recirculation water filtration system for receiving contaminated water from the drain of a water-using facility, and for delivering clean filtered water to the facility on demand. After passing through a subsurface sump and filter for removal of large particulates, the water is pumped into one or more surface-mounted tanks for storge and settlement of remaining particulates. A drain line leading to the facility drain is connected to the bottom of each tank to permit constant recirculating flow which eliminates static-water growth of bacteria and algae. A second pump system is actuated on demand by the facility to pump water from the tanks through a stage of fine filtration for delivery to the facility.

In a specific embodiment, the invention relates to a water filtration system for a vehicle washing installation having wash- and rinse-water nozzles, and a drain means for collecting contaminated wash and rinse water draining from a vehicle conveyed through the installation. The system includes a sump means connected to the drain means to receive the contaminated water. The sump means is preferably arranged as a pair of open-top subsurface tanks, each of which has a filter means such as a screen for trapping relatively large particulates in the incoming contaminated water.

A first pump means includes a power-driven pump having an inlet line connected to the sump-means tanks, an outlet line, and an intermediate filter means in the inlet or outlet line for trapping intermediate-sized particulates. Preferably, a pair of filters are provided on opposite sides of the pump, and the mesh size of these filters is sufficiently small to capture particulates larger than 70 to 80 microns in size. Check valves are preferably provided in the pump inlet and outlet lines to prevent unwanted siphoning backflow, and to maintain pump prime.

A storage means, preferably comprising first and second settling tanks, is connected to the outlet line of the first pump means. A drain port or line is provided at the bottom of each settling tank to drain and remove particulate contaminates settling to the bottom of each tank, and to provide a constant recirculating flow of water through the system. In an alternative embodiment, the first settling tank may include an inclined-plate separator for improved removal of particulates, and to enable decanting of oily residues in the water being processed.

A second pump means includes a power-driven pump having an inlet line connected to the storage-means settling tanks, and an outlet line connected to a fine filter means. Preferably, the fine filter means includes first and second centrifugal separators for removing very fine particulates from the water. An outlet line from the centrifugal separators is connected to the wash-water nozzles of the vehicle washing installation, and a coalescing filter may be inserted in series with the outlet line for additional filtering of oily residues from the water being pumped to the nozzles.

The cleaned and recirculated water is used only in the washing portion of the vehicle washing installation, and a fresh-water supply means is provided for connection to the rinse nozzles to provide uncirculated clean water under pressure for vehicle rinsing. Preferably, the fresh water supply means includes a booster pump enabling the fresh water to be delivered to the rinse nozzles under high pressure.

BRIEF DESCRIPTION OF THE DRAWINGS

FIG. 2 is a schematic elevation of the filter system and its components.

DESCRIPTION OF THE PREFERRED EMBODIMENT

Figure 1:
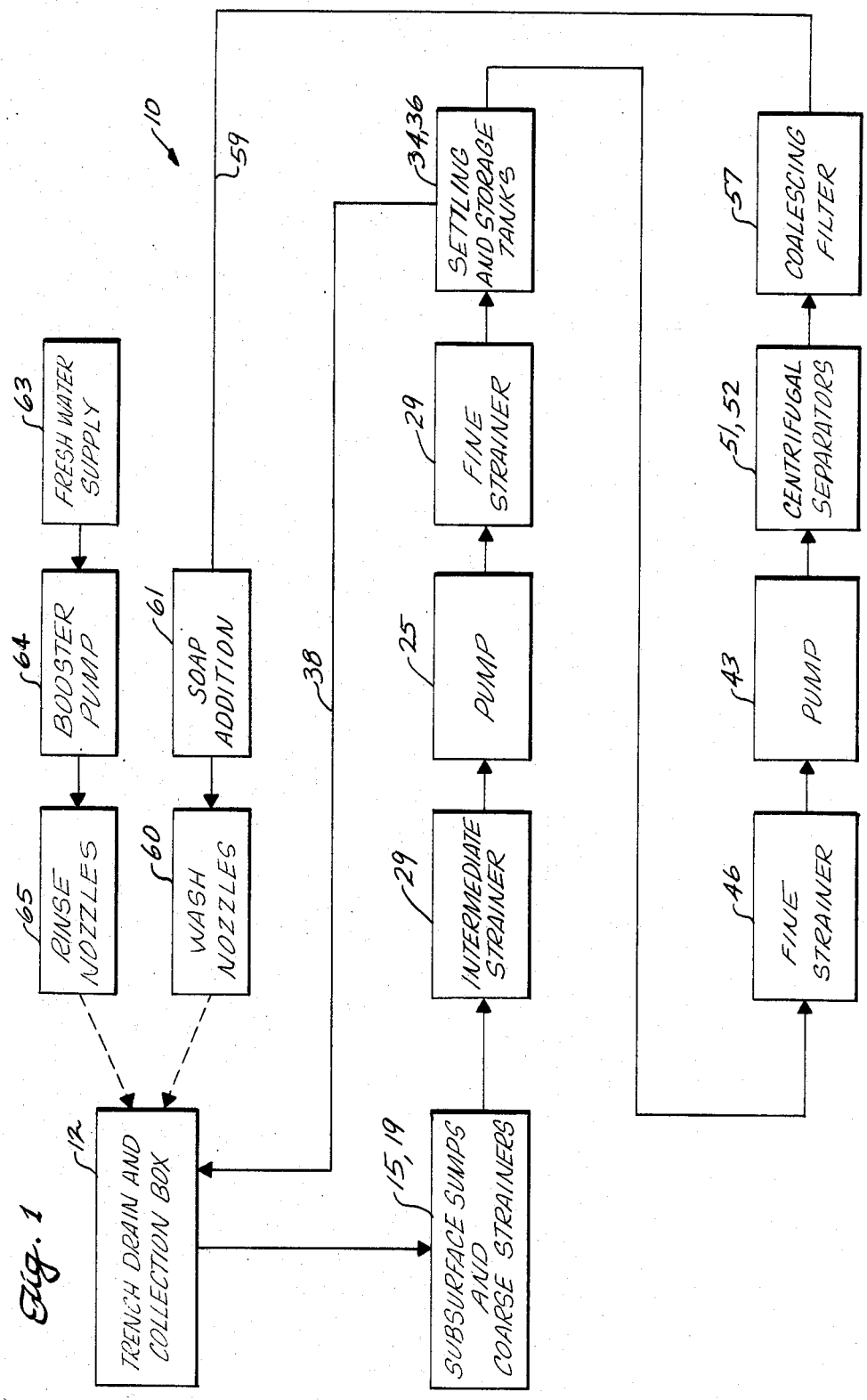
FIG. 1 is a block diagram of the principal elements of the filter system of this invention.

A water filtration system 10 for vehicle-washing installations is shown in FIGS. 1 and 2 of the drawings. The system is adapted for use with a variety of commercially available rotary brushes and vehicle conveyers, and these conventional components are omitted from the drawings for clarity. It is a feature of the invention, however, that the filtration system is formed of modular and easily transportable elements which are well adapted for either retrofit in existing washing installations, or as original equipment in new installations.

As is conventional in vehicle-washing installations, wash and rinse water draining from a vehicle being conveyed through the installation is caught in a sloping trench drain in the floor of the installation beneath the vehicle. This contaminated water is guided by the trench drain to a collection box from which the water flows by gravity to the inlet of the filtration system. The trench drain and collection box are conventional sump components in vehicle washers, and are collectively identified by numeral 12 in the block diagram of FIG. 1.

Water from the collection box enters through an inlet 14 of a first sump 15 which is an open-top tank of about 200 gallons capacity. Water flowing through the inlet into the first sump first passes through a leaf filter 16 which is preferably a screen adapted to prevent passage of relatively coarse particulates in a size range of 100 microns or larger. Large particulates, such as leaves and other debris, are immediately trapped by filter 16 and prevented from circulating through the system. Filter 16 is preferably formed as a mesh basket which is readily accessible from the surface at the top of the tank for removal and emptying.

Trench drain and collection box 12, sump inlet 14, and sumps 15 and 19 serve as water collection means for collecting the wash and rinse water draining from the vehicle washing installation.

A second sump 19 is generally similar in size and configuration to first sump 15, and is positioned below the surface adjacent the first sump. A transfer line 20 extends between the upper ends of the first and second sumps, and coarsely filtered water flows from the first sump into the second sump. Another leaf filter 21 catches water flowing into the second sump, and is preferably a wire-mesh basket configured to trap particulates of about 80 microns or larger.

An outlet line 23 extends upwardly from the lower end of second sump 19 for connection to a first pump system 24 (FIG. 2) having a series of floor-mounted components which are readily accessible for servicing or cleaning. Pump system or pumping means 24 includes a pump 25 such as a surface-mounted centrifugal pump driven by an electric motor 26. Inlet and outlet lines 27 and 28 are connected to the pump, and each line includes a dual in-line filter or strainer 29 having a mesh size sufficiently small to capture particulates in a size range above about 70 microns.

Alternatively, a conventional fully submersible electrically driven pump may be used to draw water from the second sump. If a submersible pump is selected, a preferably flexible line or hose is used to couple the pump outlet to surface-mounted filters 29. The flexible hose enables the pump to be simply lifted out of the sump and set aside during routine sump cleaning.

Whichever pump style is selected, conventional float switches 71 or equivalent controls are used to command operation of the pump whenever the second sump is nearly full. Pump operation is continued until the water level approaches the lower end of the sump, and pump operation may be substantially continuous when clean filtered water is being constantly drawn from the filtration system.

The end of inlet line 27 upstream of associated strainer 29 is connected to the upper end of outlet line 23, and outlet line 28 downstream of associated strainer 29 is connected to a delivery line 30. Preferably, conventional pressure gauges 31 are positioned on the inlet and outlet lines on the upstream and downstream side of the associated strainers to indicate the differential pressure across the strainers, and hence the condition of the filtering elements. Check valves 32 are also installed in a vertically extending portion of outlet line 28, and at the lower inlet end of outlet line 23 to prevent any siphoning backflow through pump system 24, and to insure that pump 25 remains in a primed condition.

Filtered water from first pump system 24 flows into a first above-ground holding tank 34 which preferably has a capacity of about 1000 to 1500 gallons. The outlet end of delivery line 30 is connected through the side wall of the first holding tank a few inches below the tank top. Water from the first holding tank flows through an outlet line 35 into a second holding tank 36 preferably positioned adjacent tank 34 and having a similar capacity of about 1000 to 1500 gallons. Both the first and second tanks are provided at their lower ends with a drain line 38 permitting a substantial and continuous flow of water and small settled particulates, i.e. sediment laden water, from the tank bottoms. Tanks 34 and 36 may be collectively referred to as water storage means.

As shown in FIG. 2, drain lines 38 (which may include adjustable valves for regulating flow rate) establish fluid communication with the lower part of lower section of tanks 34 and 36 and transfer water from holding tanks 34 and 36 to trench drain and collection box 12 for recirculation through the sumps and filters back into the holding tanks. This continuous recirculation and flow of water from the holding tanks eliminates the problem of bacteria and algae growth which would occur if the water at each tank bottom was static. Development of unpleasant odor is thus prevented, and an adequate supply of clean filtered water is constantly available to be drawn from the holding tanks. Any excess water delivered to the holding tanks overflows to the trench drain through an upper drain line (not shown) connected adjacent the upper end of each tank.

This continuous recirculation of water from tanks 34 and 36, through drain lines or continuous flow means 38, into sumps 15 and 19, and through pumping means 24 back into tanks 34 and 36 defines a first loop for continuously recirculating all water within the system at a gravity-induced flow rate.

When a vehicle is being washed, water is drawn from the second holding tank by a second pump system 42 which includes a centrifugal pump 43 driven by an electric motor 44. As is conventional in vehicle washing installations, actuation of motor 44 is enabled by a switch (not shown) tripped as the vehicle enters the installation, and is disabled by an exit switch (not shown) tripped as the vehicle exits the installation in the absence of following vehicles. Actuation of the "entry" switch energizes pump system 42 and switches the vehicle washing system from nonwashing mode into a washing or "operating" mode. Deactivation of pump system 42 by the "exit" switch returns the vehicle washing system into the non-washing mode.

An inlet line 45 is connected between the second holding tank and the upstream side of pump 43, and the inlet pipe includes a dual in-line filter or strainer 46 having a mesh size sufficiently small to retain particulates in the size range of 40 microns or larger. Pressure gauges 47 are positioned on opposite sides of strainer 46 to display differential pressure to the operator, and hence to indicate when the mesh elements of the strainer should be removed and cleaned.

An outlet line 50 is connected from the downstream end of pump 43 to the inlet of a pair of series-connected centrifugal separators 51 and 52. Centrifugal separators of a satisfactory type are well known in the filtration arts, and are commercially available from companies such as Claude Laval Corporation. Very fine particulates removed by the centrifugal separators settle to the lower ends of these filtration elements, and can be periodically purged from the system by opening drain valves 53 at the lower ends of the separators.

An outlet line 55 from the downstream delivery end of the second centrifugal separator supplies filtered water under pressure to an optional and conventional carbon or coalescing filter 57 which may be used if oily residues are detected in the filtered water. Preferably, the coalescing filter uses throw-away cartridges, and is equipped with the usual upstream and downstream pressure gauges 58 to show when the cartridge requires replacement. An outlet line 59 extends from the coalescing filter to wash nozzles 60 (FIG. 1) in the vehicle washing installation, and a conventional soap or detergent addition station 61 is coupled to the outlet line upstream of the wash nozzles. The various elements responsible for transferring water from inlet 45 of tanks 34 and 36 to wash nozzles or spray means 60 may be generally referred to as water transfer means.

The water path through the water storage means, the water transfer means, the spray means, the water collection means and the pumping means 24 defines a second loop which intermittently directs water through the spray means onto a vehicle to recirculate all water within the system when the system is placed in the operating mode to wash the vehicle.

Whether the system is operating in the non-washing mode or in the operating mode, all of the water within the system continuously recirculates.

Referring to FIG. 1, the water supply to the vehiclewashing installation is completed by a buffer tank holding a fresh water supply 63 which feeds a conventional electrically driven centrifugal booster pump 64, the outlet of which is coupled to rinse nozzles 65 in the washing installation.

In another form of the invention, first holding tank 34 is modified to include an up-flow inclined-plate separator of a style well-known in the filtration art (see e.g., U.S. Pat. No. 4,120,796 and the prior-art patents therein cited). In an inclined-plate separator, incoming water is directed to the bottom of the tank where it enters and flows upwardly through spaces between a series of spaced-apart and upwardly inclined imperforate plates. Particulates flowing between the plates tend to agglomerate and fall by gravity to the bottom of the tank where they can be removed through a lower drain line as already described. An overflow collector can also be positioned at the upper end of the inclined-plate assembly to collect suspended oil or grease which can then be decanted from the upper end of the tank. Use of the optional inclined-plate separator is recommended where incoming water from the washing installation is unusually dirty or contaminated with large amounts of oily residues.

Second pump system 42 and booster pump 64 are actuated only when a vehicle is passing through the installation to be washed. In a more fully automated system, the pressure gauges described above may be replaced by conventional pressure transducers and associated electronics to provide an audible alarm signal when filter differential pressure rises to a point showing the need for filter cleaning.

Manipulation of complex valve systems as required for backwashing filters in conventional filtration systems is completely eliminated in the system of this invention. All mesh filters in the system which require periodic cleaning are readily accessible from the surface, and can be quickly removed and cleaned when the pumping systems are not in operation.

A particular feature of the invention is the use of only unrecycled fresh water for rinsing of vehicles. Use of fresh rinse water significantly reduces vehicle-spotting problems, and automatically provides makeup water to the system to compensate for the significant amount of water carried off by each vehicle passing through the installation. Sewer drain requirements are reduced or eliminated because all water recovered from the vehicle washing area through the trench drain is purified and recycled for repeated use.

What is claimed is:

1. In a vehicle washing system including spray means for intermittently spraying water onto a vehicle on demand, a water reclamation system comprising:
    a. water collection means for collecting the water draining from the vehicle washing system;
    b. water storage means having an upper surface, a lower surface, an input port positioned at an elevation at or below the upper surface but spaced above the lower surface of said water storage means, and an output port positioned at an elevation below said input port and above the lower surface of said water storage means;
    c. means for pumping the water from said water collection means into the input port of said water storage means;
    d. means for sensing the quantity of water in said water collection means and for energizing said pumping means to maintain quantity of water in said water collection means below a predetermined quantity;
    e. drain port means coupled to said water storage means in proximity to the lower surface of said water storage means and below the output port of said water storage menas for accessing all sediment laden water in said water storage means;
    f. continuous flow means coupled to said drain port means and to said water collection means for preventing stagnation of the sediment laden water in said water storage means by maintaining a substantially continuous flow of the sediment laden water from said drain port means into said water collection means;
    g. water transfer means coupled to the output port of said water storage means for providing a water flow path from said water storage means to said spray means; and
    h. the water flow path through said water storage means, said drain port means, said continuous flow means, said water collection means and said pumping means defining a first loop for continuously recirculating all water within said system when said system is operating in a non-washing mode and the water flow path through said water storage means, said water transfer means, said spray means, said water collection means, and said pumping means defining a second loop for intermittently directing water through said spray means onto said vehicle when said system is placed in an operating mode to wash said vehicle;

whereby water stagnation is eliminated by maintaining a continuous, recirculating flow of all water between said water storage means and said water collection means whether said system is functioning in the non-washing mode or in the operating mode.

2. The water reclamation system of claim 1 wherein said water storage means includes:
   a. a first water storage tank having an upper and a lower surface and including the input port of said water storage means;
   b. a second water storage tank having an upper and a lower surface and including the output port of said water storage means; and
   c. water level equalizing means coupled to said first and second water storage tanks at elevations intermediate to the upper and lower surfaces of said tanks for permitting gravity flow of water between said first and second water storage tanks to equalize the water levels in said tanks.

3. The water reclamation system of claim 2 wherein said drain port means includes:
   a. a first drain port coupled to access the sediment laden water proximate to the lower surface of said first water storage tank; and
   b. a second drain port coupled to access the sediment laden water proximate to the lower surface of said second water storage tank.

4. The water reclamation system of claim 3 wherein said water level equalizing means is coupled to said second water storage tank at an elevation above the output port of said water sotrage means.

5. The water reclamation system of claim 4 whrein said water level equalizing means is coupled to said first and second water storage tanks at equal elevations.

6. The water reclamation system of claim 5 wherein said water level equalizing means is coupled to said first and second water storage tanks at a level substantially equidistant between the upper and lower surfaces of said tanks.

7. The reclamation system of claim 2 wherein said first and second water storage tanks have an equal water storage capacity and are mounted side by side with the lower surfaces of said tanks positioned at ground level.

8. The water reclamation system of claim 1 wherein the flow of sediment laden water from said water storage means through said continuous flow means is maintained by a gravity-induced head pressure and establishes a gravity-induced flow rate.

9. The water reclamation system of claim 1 wherein said pumping means is intermittently energized to transfer water from said water collection means into said water storage means.

10. The water reclamation system of claim 1 wherein said water transfer means includes an intermittently energized electric pump and water filtration means.

11. The water reclamation system of claim 1 wherein said water storage means operates with at least a minimum level of water and wherein said water collection means includes a sump positioned at an elevation below the minimum water level of said water storage means to maintain a gravity flow of sediment laden water from said water storage means into said sump.

* * * * *